Dec. 6, 1938.    G. V. WOODLING    2,139,295
MEASURING AND REGULATING DEVICE
Filed April 22, 1932    2 Sheets-Sheet 1
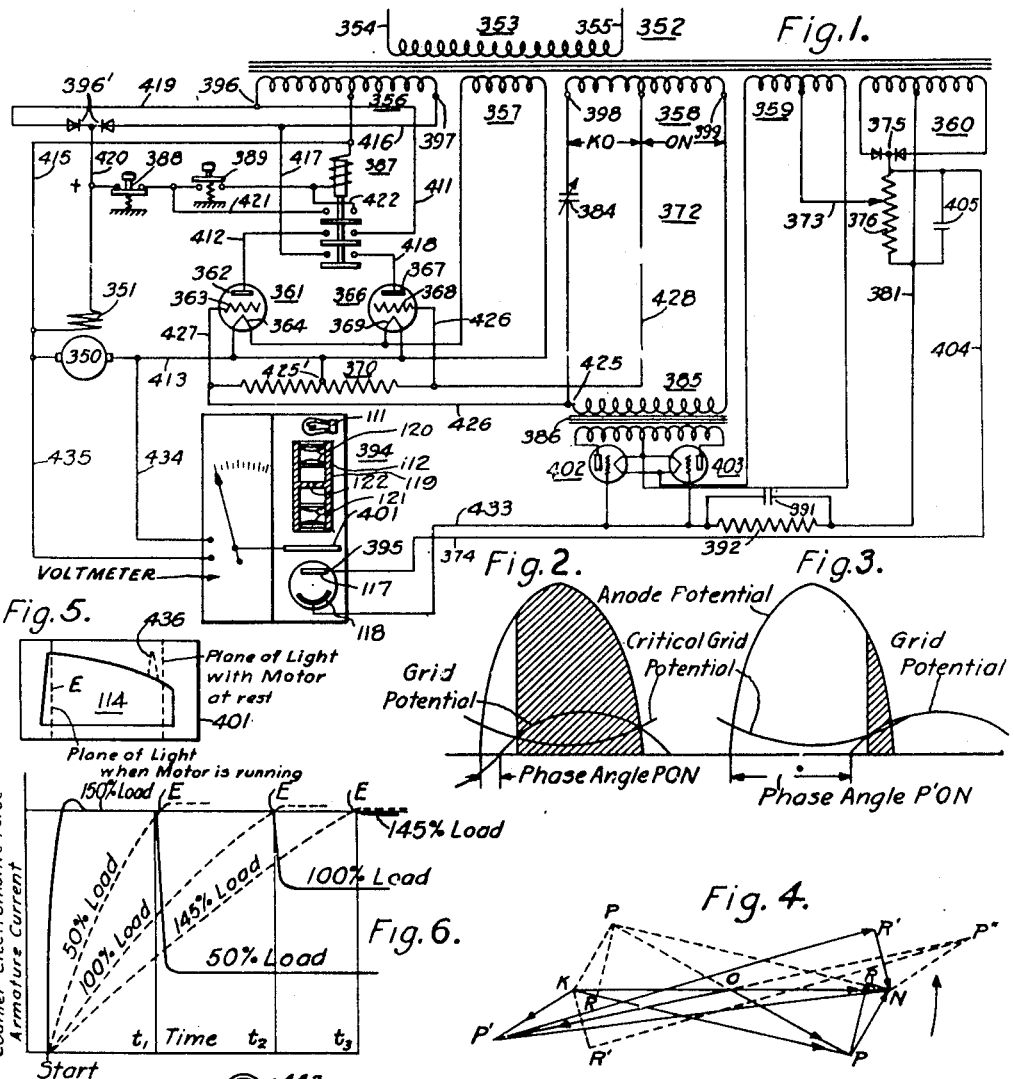
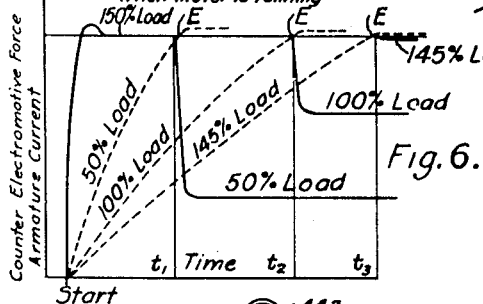
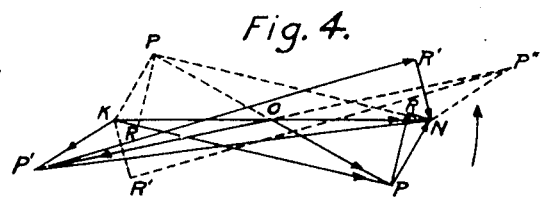
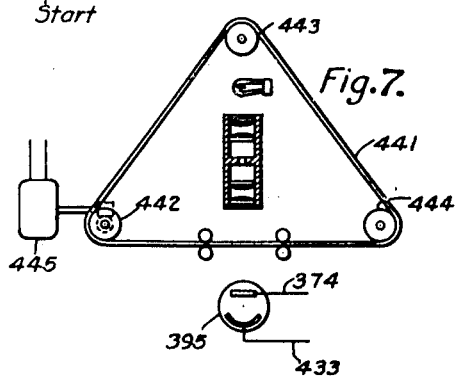
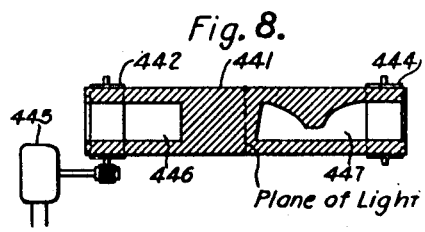
INVENTOR
George V. Woodling Dec. 6, 1938.     G. V. WOODLING     2,139,295
MEASURING AND REGULATING DEVICE
Filed April 22, 1932     2 Sheets-Sheet 2
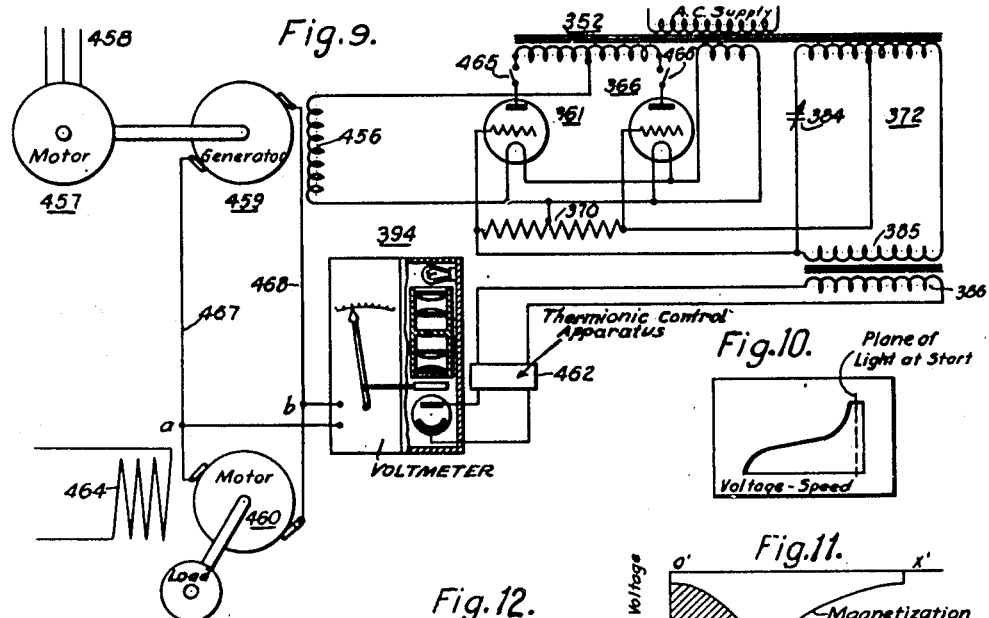
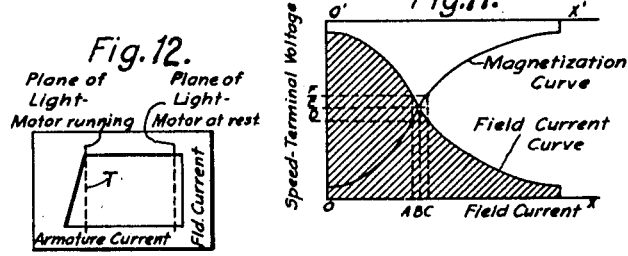
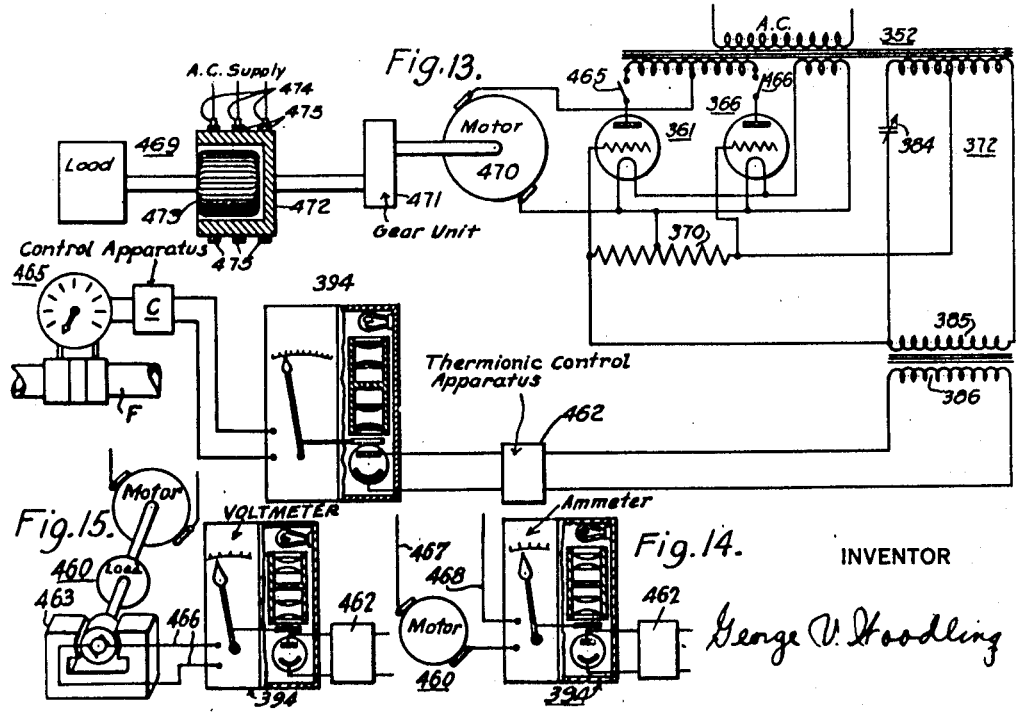
INVENTOR
George V. Woodling Patented Dec. 6, 1938

2,139,295

UNITED STATES PATENT OFFICE 2,139,295

MEASURING AND REGULATING DEVICE

George V. Woodling, Wilkinsburg, Pa.

Application April 22, 1932, Serial No. 606,837

44 Claims. (Cl. 171—312)

My invention relates, in general, to control system, and more particularly to control systems employing power grid-glow tubes and photo-electric cells.

An object of my invention is to provide for gradually and automatically accelerating an electric motor from rest to any predetermined selected speed regardless of the load condition, as well as for maintaining the speed at a predetermined selected value.

A further object of my invention is to provide for regulating and controlling a dynamo-electric machine, or other electrical devices in accordance with any functional relationship.

Another object of my invention is to provide for measuring and regulating a given condition in accordance with the amount of light falling upon a photo-electric cell, as determined by the factors affecting the given condition.

It is also an object of my invention to provide for varying the conditions of an electrical circuit by means of a photo-electric cell and a graph-member having a light transmitting portio. based upon a functional relationship.

Another object of my invention is to provide for controlling the performance of a dynamo-electric machine by means of a photo-electric cell and an endless graph-member having light transmitting portions based upon a duty cycle.

A further object of my invention is to provide for differentially connecting a limited capacity motor that is energized by power grid-glow tubes with a second motor that carries the major part of the load.

Other objects and a further understanding of my invention may be had by referring to the following specifications taken in connection with the accompanying drawings, in which:

Fig. 1 is a diagrammatic view of a control system, employing grid-controlled glow-discharge tubes illustrating a method of controlling the operating characteristics of a dynamo-electric machine in accordance with the amount of light falling upon a photo-electric cell, as determined by a graph-member, Fig. 2 is a graphical representation of the operating characteristics of a grid-controlled glow-discharge tube, the shaded portion representing the quantity of current passed by the said tube for each alternate half cycle at the illustrated phase angle potential, Fig. 3 is a graphical representation of the operating characteristics of a grid-controlled glow-discharge tube, the shaded portion representing the quantity of current passed by the said tube for each alternate half cycle at the illustrated phase angle displacement between the grid and anode potential, Fig. 4 is a vector diagram illustrating the "phase shift" method of varying the quantity of current passed by a grid-controlled glow-discharge tube, Fig. 5 is a rectangular graph-member that is disposed to vary the amount of light falling upon a photo-electric cell in accordance with the operating characteristics of a dynamo-electric machine, Fig. 6 represents a system of curves based upon the operating characteristics of a dynamo-electric machine, as controlled by the features of my invention, Fig. 7 diagrammatically illustrates a driven, endless graph-member disposed to vary the amount of light falling upon a photo-electric cell as it passes relatively thereto, Fig. 8 is an elevational view of the driven, endless graph-member, shown in Fig. 7, Fig. 9 is a diagrammatic view of a modified form of the control system, shown in Fig. 1, Fig. 10 is a rectangular graph-member having a light transmitting portion based upon the characteristics of a dynamo-electric machine, Fig. 11 represents generally a magnetization and a field current curve of a dynamo-electric machine, upon which is based the light transmitting portion of the graph-member of Fig. 10, Fig. 12 is a rectangular graph-member having a modified form of the light transmitting portion, Fig. 13 is a diagrammatic view of a further modified form of the control system shown in Fig. 1, Fig. 14 is a fragmentary modified view of the circuit diagram of Fig. 9, showing only the circuit connections between the motor 460 and the ammeter 394A, Fig. 15 is a fragmentary modified view of the circuit diagram of Fig. 9, showing only the circuit connections between the magneto 463 and the voltmeter 394.

With particular ref. ence to Fig. 1, my control system com,.ises, in general, a motor 350 having a field winding 351, a transformer 352 having a primary winding 353 connected to the supply conductors 354 and 355 and a plurality of secondary windings 356 to 369, inclusive, a pair of asymmetric units 396' for supplying uni-directional current to the field winding 351, two power grid-glow tubes 361 and 366, a relay 367 for connecting the power grid-glow tubes 361 and 366 in circuit relation with the armature of the motor 350 and the secondary transformer winding 356, a set of push buttons 388 and 389 for operating the relay 387, a bridge phase-shifting circuit indicated generally by the reference character 372, thermionic tubes 402 and 403 for controlling the bridge phase-shifting circuit 372, and an electrical meter 394 having a photo-electric cell 395, a light projector 112, a light source 111 and a graph-member 401 operated by the hand of the electrical meter.

The motor 350 is of the direct-current type and may be of any standard design. The field winding 351 of the motor 350 is energized by uni-directional current provided by the pair of asymmetric units 396' which are connected across the terminals 396 and 397 of the secondary winding 356. As is apparent, by utilizing a pair of asymmetric units, a double-wave rectification is obtained, which insures a smooth operation of the motor 350.

The transformer 352 may be of any well known type having a plurality of secondary windings. The secondary winding 356 having a mid-tap is arranged to be connected in circuit relation with the armature of the motor 350 and the power grid-glow tubes 361 and 366 by means of the relay 387. The secondary winding 357 provides energization for electrically heating the cathodes 364 and 369 of the power grid-glow tubes. The secondary winding 358 having a mid-tap comprises a part of the bridge phase-shifting circuit 372 for varying the phase relation and the magnitude of the grid potential relatively to the anode potential of the power grid-glow tubes. The secondary winding 359 provides energization for electrically heating the filaments of the thermionic tubes 402 and 403. The secondary winding 360 is connected in circuit relation with the photo-electric cell 395 and the grids of the thermionic tubes 402 and 403 for varying the impedance of the plate circuit of the thermionic tubes, which, in turn, varies the impedance of the control winding 385.

The power grid-glow tubes 361 and 366 are essentially grid-controlled gaseous discharge tubes and comprise, respectively, anodes 362 and 367, cathodes 364 and 369, which are generally called the conducting electrodes, and grids 363 and 368, which are sometimes referred to as the control electrodes. Inasmuch as power grid-glow tubes have the property of rectifying alternating current, I utilize two in order to give double-wave rectification. However, it will be readily understood that my invention is operable by using only one power grid-glow tube.

The power grid-glow tubes are preferably of the well known type wherein the cathode comprises a filament surrounded by an inert gas. The filament, when electrically heated by a suitable source of current, such as the secondary transformer winding 357, liberates primary electrons which are necessary for the functioning of a power grid-glow tube. When a potential difference is applied between the anode and the cathode, the anode being at a higher potential, the liberated primary electrons move towards the anode. As these primary electrons acquire sufficient velocity, they collide repeatedly with the atoms of the gas, and thus produce both new electrons and positive ions.

As the primary electrons, together with the newly formed electrons, move towards the anode, they will have to pass the grid structure. The grid may be charged either to a positive or to a negative potential and, therefore, help to either accelerate or retard the movements of the passing electrons. Hence, the action of the grid is such as to control the value of the anode-cathode potential at which the gas becomes ionized, or at which an arc is formed for the passage of a current between the anode and the cathode. For convenience, and in accordance with the accepted engineering term, the potential of the grid will hereinafter be considered with reference to the potential of the anode. For a given anode potential there is a definite critical-grid-potential at which ionization occurs, thus allowing the power grid-glow tubes to pass current in the form of an electric arc. If the potential of the grid, see Figs. 2 and 3, is below this critical-grid-potential, no discharge occurs, and, accordingly, no current passes between the anode and the cathode. On the contrary, if the potential of the grid rises above the critical-grid-potential, even for a momentary period, a discharge immediately occurs and current passes in the form of an electric arc between the anode and the cathode. After the arc is started, however, the grid is surrounded by a space charge, which thereby prevents it from exercising any further control over the arc. Consequently, the grid of a grid-glow tube is effective only for preventing or initiating an arc between the anode and the cathode, but is not effective in extinguishing or controlling the arc after it is once started. However, after the flow of current between the anode and the cathode ceases momentarily and thus allows the gas to deionize, the grid can regain control and prevent the arc starting again. Therefore, by applying an alternating-current to the anode and the cathode, the grid has an opportunity for regaining control once each cycle and can delay the starting of an arc for as long a time during the cycle as the potential of the grid is below the critical-grid-potential.

For the control of grid-glow tubes, two fundamental methods, well known in the art, are available. The first or "magnitude" method is where the phase relation of the grid potential relatively to the anode potential remains fixed but where the magnitude of the grid potential is varied relatively to the anode potential for controlling the current passing between the anode and the cathode. The second or "phase-shifting" method is where the magnitude of the grid potential remains substantially fixed relative to the anode potential, but where the phase relation of the grid potential relatively to the anode potential is shifted for controlling the current passing between the anode and the cathode.

In the practice of my invention I prefer to employ the "phase-shifting" method. However, as the description advances, it will be seen that although my method of control is primarily the "phase-shifting" method, still it partakes of the "magnitude" method, thus resulting in a combination of the two. As illustrated, the bridge circuit 372 for shifting the phase and the magnitude of the grid potential relatively to the anode potential of the power grid-glow tubes comprises an adjustable capacitor 384, a control winding 385 both connected in series circuit relation with the secondary transformer winding 358, and a grid resistor 370 connected between the mid-tap of the secondary winding 358 and a junction point 425 of the capacitor 384 and the control winding 385. As shown, the grid resistor 370 has a mid-tap 425' and comprises two sections. The left-hand section is connected in parallel circuit relation with the grid 363 and the cathode 364 of the power grid-glow tube 361. Similarly, the right-hand section is connected in parallel circuit relation with the grid 368 and the cathode 369 of the power grid-glow tube 366. Hence, by reason of the fact that the grids of the power grid-glow tubes and their respective sections of the grid resistor 370 are connected in parallel circuit relation, the phase relation and magnitude of the grid potential relatively to the anode potential vary in accordance as the phase relation and magnitude of their respective sections of the grid resistor 370 is varied by the bridge phase-shifting circuit 372.

Consider Figs. 2, 3 and 4, which represent graphically and vectorally how a change in grid potential relatively to the anode potential varies the amount of current passing between the anode and the cathode. With particular reference to Figs. 2 and 3, the large substantially sinusoidal wave represents the anode potential and the small substantially sinusoidal wave represents the grid potential. The concave shaped curves represent the critical-grid-potential of the power grid-glow tubes. So long as the grid potential is below the value of the critical-grid-potential, no arc between the anode and the cathode is formed for passing current. However, just as soon as the value of the grid potential rises to, or above, the critical-grid-potential, being the point where the grid potential curve intersects the critical-grid-potential curve, ionization occurs and an arc is formed for passing current between the anode and the cathode for the remaining part of the half cycle. In Figs. 2 and 3, the shaded portions represent, respectively, the quantity of current passing between the anode and the cathode during each half cycle at the illustrated phase angle displacements. Hence, it is possible to vary the quantity of current passing between the anode and the cathode from a minimum to a maximum by merely shifting the phase of the grid potential relatively to the anode potential. Fig. 4 shows a vectorial representation of how the grid potential is shifted relatively to the anode potential.

The vector KO represents the potential between the terminal 398 and the mid-tap of the secondary transformer winding 358, and the vector ON represents the potential between the mid-tap and the terminal 399 of the secondary transformer winding 358. Since the anodes 362 and 367 of the power grid-glow tubes are connected in circuit relation with the secondary transformer winding 356, the phase relation of the anode potential of the power grid-glow tubes is always in phase with the vectors KO and ON. The potential across the capacitor 384 is represented generally by the length of the vector KP. When the impedance of the thermionic tube 402 is relatively low, the potential across the control winding 385 is represented by the length of the vector PN, the vector PR representing the reactive drop and the vector RN representing the ohmic drop. Hence, the phase relation of the grid potential relatively to the anode potential is represented by the angle PON, while the length of the vector OP represents the magnitude of the grid potential. Under this condition the phase relation between the grid and the anode potential is relatively small, with the result that the power grid-glow tubes pass current during substantially the entire half-cycle, being the condition represented, generally, by the shaded portion in Fig. 2. As the impedance of the thermionic tube 402 is gradually increased, by allowing less light to fall upon the photo-electric cell 395, the voltage across the control winding 385, correspondingly, increases to a value represented, generally, by the vector P'N, the vector P'R' representing the corresponding reactive drop and the vector R'N the ohmic drop. This action causes the grid vector OP to swing in a clockwise direction to OP'; thus causing a greater lag in the phase of the grid potential relatively to the anode potential. Hence, the phase relation of the grid potential relatively to the anode potential is represented by the angle P'ON while the magnitude of the grid potential is represented by the length of the vector OP'. With a relatively large phase-angle between the grid potential and the anode potential, the power grid-glow tubes pass current only during a small portion of each half-cycle, as represented, generally by the shaded portion in Fig. 3. Therefore, by varying the impedance of the thermionic tube 402, or in other words the potential across the control winding 385, the quantity of current passed by the grid-glow tubes may be varied from a minimum to a maximum. The dotted lines above the vectors KO and ON represent the magnitude of the phase relation of the grid potential relatively to the anode potential during the other half-cycle of the alternating current.

As illustrated, the manner of varying the impedance of the plate circuit of the thermionic tubes 402 and 403 is governed by the amount of light falling upon the photo-electric cell 395, as determined by the gaph-member 401. The graph-member 401, may be constructed either of a thin sheet of opaque material or of a photographic film. When the graph-member 401 is constructed of a thin sheet of opaque material, the light transmitting portion 114 takes the form of an aperture, but when a photographic film is used, the light transmitting portion 114 is transparent while the surrounding portion is dark. In the case of a photographic film, it is essential that the degree of transparency be uniform throughout the light transmitting portion 114. By utilizing a photographic film, the graph-member may be plotted on an enlarged scale and reduced to a size applicable for the photo-electric cell by taking a reduced photograph of the enlarged graph-member. This makes a very accurate and convenient method of making graph-members.

The maximum height of the light transmitting portions of the graph-members must not exceed the illumination boundaries of a photo-electric cell.

Two well known methods are available for varying the amount of light that passes through the light transmitting portion 114 of the graph-member 401. One may be termed the "linear" method, and the other the "area" method. With reference to the projector 112, the "linear" method may be described as follows. The light projector 112 comprises, in general, a cylindrical housing 119 in which are disposed, at the upper end, two condensing lenses 120 and, at the lower end, two objective lenses 121, and, in the middle, a transversely disposed member having a vertical narrow slit 122. By means of the condensing lenses 120 and the objective lenses 121, and the slit 122, the light from the concentrated filament of the lamp 111 is formed into a plane of light. The intensity of this plane of light may be suitably varied by adjusting the voltage impressed upon the electric lamp.

As shown, this plane of light is directed perpendicularly to the plane of the transversely disposed graph-member 401. By reason of the demagnifying effect of the lenses the width of the plane of light at its focal point, being the point at which it passes through the light transmitting portion 114, is several times smaller than the width of the slit 122. The breadth or the height of the plane of light is slightly greater than the maximum height of the light transmitting portion 114. Therefore, the quantity of light falling upon the photo-electric cell 395 is determined by the amount that the graph-member 401 is transversely moved relatively to the plane of light, or, in other words, by the height of the ordinate of the light transmitting portion 114.

The shape of the light transmitting portion 114 may conform to any functional relation. If a variable $y$ depends upon a variable $x$ so that to every value of $x$ there corresponds a value of $y$, then $y$ is said to be a function of $x$, written $y=f(x)$. However, the existence of a functional relation between two quantities does not imply the possibility of giving this relation a mathematical formulation. Even though no mathematical expression for the function is known, it may still be represented graphically. As will appear later in the description, my invention may be readily adapted to regulate or control a condition in accordance with a certain functional relation, regardless of whether or not the functional relation can be mathematically expressed, and herein resides the utility of my invention. Therefore, depending upon the shape of the light transmitting portion of the graph-member, the dynamo-electric machine 350 may be regulated to accommodate any particular operating condition.

The photo-electric cell 395 is a light-sensitive device which, when connected to a circuit of the proper potential and when illuminated from a suitable source, passes a very small amount of current, of the order of micro-amperes. The photo-electric cell 395 comprises, generally, an anode 117 and a cathode 118 sealed within either an evacuated space or within a space filled with a gas at a very low pressure. The cathode 118 is constructed of a material that has the property of liberating electrons when illuminated. By impressing a potential of the proper polarity and magnitude upon the anode 117 and the cathode 118, the liberated electrons move toward the anode 117, thus effecting a passage of current in response to the light falling upon the cathode 118. Throughout the usual range of illumination, the current passed by a photo-electric cell is directly proportional to the illumination.

The circuit connections for varying the impedance of the plate circuit of the thermionic tubes 402 and 403, in accordance with the light falling upon the photo-electric cell 395, are somewhat standard. A pair of asymmetric units 375 are provided to impress a uni-directional current upon the photo-electric cell 395, so that operation is obtained during both the positive and negative loops of the alternating current. The asymmetric units 375 are connected across the secondary transformer winding 360. For the purpose of maintaining the potential of the grids of the thermionic tubes 402 and 403 negatively with respect to their filaments, a grid potentiometer 376 is connected between the midtap of the asymmetric units 375 and the negatively energized conductor 381 that is connected to the mid-tap of the secondary transformer winding 360. A capacitor 405 is connected across the potentiometer 376 to give smoother operation. The movable pointer of the potenticmeter 376 is connected to the mid-tap of the secondary transformer winding 359 by means of a conductor 373. In this manner, the grids are maintained negatively with respect to their filaments to the extent that the movable pointer of the potentiometer 376 is moved away from the negatively energized conductor 381. Therefore, when the movable pointer of the potentiometer 376 is properly adjusted, assuming that there is no light falling upon the photo-electric cell 395, the potential of the grids are highly negatively charged with respect to their filaments, and, accordingly, the impedance of the plate circuit of the thermionic tubes are relatively high. Hence, under the condition that there is no light falling upon the photo-electric cell 395, the potential across the control winding 385 is relatively high as compared to the potential across the adjustable capacitor 384, with the result that the phase angle between the grid and the anode of the power grid-glow tubes is relatively large. Accordingly, the grid-glow tubes pass very little current for operating the motor 350.

However, when the photo-electric cell 395 is illuminated, a grid current flows through the grid resistor 392 for lowering the impedance of the thermionic tubes 402 and 403. This grid current flows from the mid-point of the asymmetric units 375 through a conductor 404, the electrodes of the photo-electric cell 395, a conductor 433, the grid resistor 392, and the conductor 381 to the mid-tap of the secondary transformer winding 360. This grid current that flows through the photo-electric cell 395 creates a drop in potential across the grid resistor 392, which, in turn, causes the grids of the thermionic tubes 402 and 403 to become less negatively charged with respect to their filaments. As a result of this action, the impedance of the plate circuit of the thermionic tubes decreases, thus causing a corresponding decrease in the potential across the control winding 385. This means that the phase angle between the grid and the anode of the power grid-glow tubes is reduced to a comparatively small value and the grid-glow tubes accordingly pass a relatively large amount of current for operating the motor 350. Consequently, from the foregoing, it is noted that the current passed by the power grid-glow tubes is directly proportional to the amount of light falling upon the photo-electric cell 395. The grid condenser 391 serves to maintain the effective grid voltage in phase with the plate voltage for values of high grid resistance, thereby assuring the most effective use of the grid bias voltage.

As illustrated, the quantity of light falling upon the photo-electric cell 395 is controlled by the aperture of the graph-member 401, (see Fig. 5). The graph-member 401 may be actuated relatively to the plane of light in accordance with the operating conditions of the motor 350. To this end the graph-member 401 is connected to the hand of the electrical meter 394, so that the amount of light falling upon the photo-electric cell 395 may be varied in accordance with the position of the hand of the electrical meter. In this embodiment of the invention, the object is to vary the amount of light falling upon the photo-electric cell 395 in accordance with the terminal voltage of the motor 350. Hence, for this purpose, the electrical meter 394 is of the voltmeter type and is connected across the armature of the motor 350 by means of conductors 434 and 435. Although I have preferably shown the graph-member 401 actuated by the hand of a voltmeter, it is readily apparent that the graph-member may be directly actuated by means of a solenoid connected across the armature of the motor 350.

The light transmitting portion of the graph-member 401, (see Fig. 5) is so shaped that the motor 350 gradually and automatically accelerates to any predetermined selected speed, regardless of the load condition. Hence, in starting the motor 350, it is only necessary for the operator to depress the push button 389, and the motor automatically and gradually accelerates to a predetermined selected speed. The closure of the contacts of the push button 389 completes a circuit for energizing the relay 387. This circuit may be traced from the mid-point of the asymmetric units 396' through the positively energized conductor 420, the push buttons 388 and 389, the winding of the relay 387, and to the mid-point of the secondary winding 356, which is negative with respect to the mid-point of the asymmetric units 396'. Just as soon as the relay 387 operates a self-energizing circuit is established through the conductors 421, the upper contacts of the relay, and the conductor 422 for continuously energizing the relay, even though the start push button 389 is no longer depressed.

During the positive half-cycle, current flows from the terminal 396 of the secondary transformer winding 356 through a conductor 411, the middle contacts of the relay 387, a conductor 412, the anode 362 and the cathode 364 of the power grid-glow tube 361, a conductor 413, the armature of the motor 350, and a conductor 415 to the mid-tap of the secondary winding 356. During the positive half-cycle, it is noted that the power grid-glow tube 366 is inoperative, because a grid-glow tube passes current only when both the anode and the grid are positive. During the negative half-cycle, the opposite condition results and the power grid-glow tube 366 is operative and the power grid-glow tube 361 is inoperative. Therefore, during the negative half-cycle, current flows from the terminal 397 of the secondary transformer winding 356 through conductors 416 and 417, the lower contacts of the relay 387, a conductor 418, the anode 367 and the cathode 369 of the power grid-glow tube 366, the conductor 413, the armature of the motor 350, and the conductor 415 to the mid-tap of the secondary winding 356. Hence, the two power grid-glow tubes 361 and 366 provide a uni-directional armature current for the direct-current motor 350. The value of the armature current, as hereinbefore pointed out, is governed by the shape of the light transmitting portion of the graph-member 401. As is apparent, the light transmitting portion may take any suitable shape, depending upon the condition under which the motor 350 is to be operated. In the instant case, the illustrated light transmitting portion of the graph-member 401 is such as to limit the armature current to a predetermined selected value during the accelerating period. That is to say, the shape of the light transmitting portion is such that, as the counter-electromotive force of the motor 350 gradually increases and causes the hand of the electrical meter 394 to move the graph-member to the right relatively to the plane of light, the power grid-glow tubes 361 and 366 break down earlier in the cycle, and thereby tend to pass an increasing amount of current; but because of the increased counter-electromotive force, the actual value of the armature current is limited to a substantially constant value during the accelerating period. Although the upper limit of the armature current may be varied either by changing the height of the light transmitting portion or by adjusting the bridge phase-shifting circuit 372, let it be assumed, for the purpose of illustration, that the armature current is limited to 150 percent of the rated full-load armature current of the motor 350. However, if this value is not sufficient to take care of the maximum torque load of the motor, it may be raised to meet the desired operating conditions. Also, for the purpose of explanation, let it be assumed that the counter-electromotive force for 150 percent load is 95 percent of the counter-electromotive force for no-load.

The operating curves based upon the foregoing assumptions are shown, generally, in Fig. 6. The counter-electromotive force and the armature current are scaled off as ordinates against time as abscissae and the full lines represent, respectively, the armature current for 50, 100 and 145 percent of the full-load armature current and the broken lines represent, respectively, the corresponding counter-electromotive forces for the said load values.

Consider the case where the motor is operating at 50 percent of the rated full-load value. When the starting push button 389 is depressed, the armature current immediately rises to 150 percent of the full-load value (according to the foregoing assumption) and remains at that value until the motor has accelerated to the point where the counter-electromotive force equals 95 percent of the no-load value (see point E for time $t_1$ in Fig. 6). During the time $t_1$, the counter-electromotive force gradually builds up and thus causes the electrical meter 394 to shift the graph-member 401 to the right. This, in turn, because of the increasing height of the light transmitting portion, allows more light to fall upon the photo-electric cell 395, and thereby causes the power grid-glow tubes 361 and 366 to break down earlier in the cycle. This tends to cause the power grid-glow tubes to pass more current, but by reason of the accompanying increase in the counter-electromotive force, the combined action of the power grid-glow tubes and the counter-electromotive force is such that while the motor is accelerating, the value of the armature current is maintained substantially at 150 percent of the rated full-load armature current. This condition prevails until the counter-electromotive force of the motor reaches 95 percent of the no-load value. The position of the graph-member 401 relative to the plane of light, when the counter-electromotive force reaches 95 percent of the no-load value, is represented by the line E of Fig. 5. At this value since (according to the foregoing assumption) the load on the motor is only 50 percent of the full-load value, the counter-electromotive force tends to increase beyond the 95 percent value, and, in so doing, causes the electrical meter 394 to shift the graph-member 401 farther to the right with respect to the line E of Fig. 39. As a result, the quantity of light falling upon the photo-electric cell 395 is abruptly reduced, thus causing a material reduction in the armature current passed by the power grid-glow tubes. The value at which the armature current again becomes stable, or at which an equilibrium is established between the armature current and the counter-electromotive force, is determined by the extent of the load connected to the motor. That is to say, the lighter the load the higher the counter-electromotive force tends to build up, with the result that the graph-member 401 is shifted farther to the right of the line E with a light load than with a heavier load. In the event that the increasing counter-electromotive force tends to shift the graph-member 401 too far to the right of the line E for a given load condition, the power grid-glow tubes will pass insufficient current to carry the load. When this condition is reached, because of the stalling of the motor, the counter-electromotive force will be reduced and allow the power grid-glow tubes to pass sufficient current, so that the motor may carry the load. Therefore, with reference to Fig. 6, when the counter-electromotive force for the 50 percent load condition builds up to the point E, the armature current is sharply reduced to, and becomes stable, at 50 percent of the rated full-load armature current and the motor continues to operate at this value, unless the load condition changes.

Should the motor 300 be connected to a 100 percent load, the action is the same as that just described, except that the time required for the motor to accelerate to the point where the counter-electromotive force is 95 percent of the no-load value is somewhat longer (see point E for time $t_2$ of Fig. 6). As illustrated, when the counter-electromotive force builds up to the point E for time $t_2$, the armature current immediately decreases to, and becomes stable at, the 100 percent value. A similar action occurs when the motor is connected to a 145 percent load, except that it takes a still longer time for the motor to accelerate to the point where the counter-electromotive force is 95 percent of the no-load value (see the point E for time $t_3$). As is apparent, when this point is reached, the armature current decreases to, and becomes stable at 145 percent of the rated full-load armature current.

Because of the steepness of the left edge of the light transmitting portion of the graph-member 401 the counter-electromotive force for all load conditions is substantially the same (see the flat portion at the upper end of the counter-electromotive force lines in Fig. 6). This means that the speed of the motor 350 is maintained substantially constant for all load conditions, while at the same time, with substantially no reduction in efficiency because the power grid-glow tubes act, in a sense, as valves and accordingly, have no power loss. With this method of control, any predetermined speed may be selected by adjusting the grid potentiometer 370 or the adjustable capacitor 384. Therefore, from the foregoing, it is noted that my control system provides for automatically and gradually accelerating a motor from rest to any predetermined selected speed, and for maintaining said speed substantially constant for all load conditions.

Some applications, however, may call for the motor to develop a relatively large starting torque. This is especially true when the motor is connected to a high inertia load. This may be taken care of by increasing the height of the light transmitting portion of the graph-member 401 for a short duration of time at the starting of the load, as represented by the dotted lines 436 of Fig. 5. In this manner, the power grid-glow tubes pass a relatively large amount of armature current for producing a relative high momentary, starting torque to set the high inertia load in rotation.

In Figs. 7 and 8, I illustrate an endless graph-member 441 having suitable light transmitting portions to govern the amount of light falling upon the photo-electric cell 395, which, in turn, controls the performance of the motor 350. As illustrated, the endless graph-member 441 may be carried by suitably mounted rollers 442, 443 and 444. The roller 442 may be driven by a synchronous motor 445 so that the endless graph-member 441 may make one complete revolution during a predetermined length of time. In this manner, by providing suitable light transmitting portions based upon the operating condition of a duty cycle, the motor may be automatically operated in accordance with such conditions. In the position as illustrated in Fig. 8, the motor 350 is stopped because no light is falling upon the photo-electric cell 395.

In Fig. 9, I show a modified form of the control system wherein the power grid-glow tubes provide field excitation for a dynamo-electric machine instead of the armature current. The parts of this control system are the same as similar parts of the control system shown in Fig. 1, except that, for the purpose of simplification, the relay 387 of Fig. 1 is replaced by the knife switches 465 and 466, and the thermionic tubes 402 and 403 and their associated circuits are designated, generally, by the reference character 462. In the modified showing of Fig. 9, the power grid-glow tubes 361 and 366 are connected in circuit relation with a field winding 456 of a generator 459 that is driven by a motor 457 connected to a suitable source of electrical energy 458. The armature of the generator 459 is connected in closed circuit relation with the armature of a driving motor 460 by means of conductors 467 and 468. The field 464 of the driving motor 460 may be energized from any suitable source.

As is apparent, with the illustrated motor-generator connections, the driving motor 460 may be controlled by varying the excitation of the field winding 456 of the generator 459. For instance, the torque of the driving motor 460 may be maintained at a substantially constant value by varying the excitation of the field winding 456 in accordance with the armature current of the driving motor 460. To this end, I provide for connecting the electrical meter 394, which in this case would be an ammeter, in series circuit relation with the conductor 468, (see Fig. 14). Therefore, if the excitation of the field winding 456 is such as to cause the generator to deliver a constant current, the torque of the driving motor 460 will be constant; provided, of course, that the excitation of the field winding 464 is constant. The graph-member for causing the generator to deliver a constant amount of current is shown in Fig. 12. With this graph-member, just as soon as driving motor 460 tends to draw more than the selected predetermined amount of armature current, the electrical meter 394 shifts the graph-member farther to the right with respect to the line T, and, in so doing, the amount of light falling upon the photo-electric cell is reduced. This, accordingly, reduces the excitation of the field winding 456, with the result that the current delivered by the generator 459 is reduced to the said selected predetermined value. The regulation, as provided by this control system, is very sensitive because, at the instant, the graph-member is shifted to the right, beyond the line T, the photo-electric cell immediately acts to cause the power grid-glow tubes to deliver less current.

Should it be desired to maintain the voltage impressed upon the motor 460 at a substantially constant, predetermined selected value, this may be done by varying the excitation of the field winding 456 in accordance with the terminal voltage of the motor 460. In order to accomplish voltage regulation, the electrical meter 394, which in this case would be a voltmeter, is connected across the conductors 467 and 468 by means of conductors a and b. For voltage control, the graph-member shown in Fig. 10 is utilized. The light transmitting portion of this graph-member is based upon the field current curve of Fig. 11, the shaded area representing the shape of the light transmitting portion. The field current curve is derived from the magnetization curve of the generator 459; so that, for a given change in terminal voltage of the motor 460, the corresponding change in the exciting current for the field winding 456 is such as to produce a change in the voltage delivered by the generator 459 that just balances the said change in terminal voltage of the motor 460.

In other words, the shape of the field current curve with respect to line O'X' is the same as the magnetization curve with respect to the line OX. Therefore, any change in the terminal voltage of the motor 460 produces an equal and opposite change in the voltage delivered by the generator 459. With reference to Fig. 11, the normal operating terminal voltage of the generator 459 is determined by the intersection of the field current curve and the magnetization curve. Hence, OE represents the normal operating terminal voltage of the generator 459, and OB represents the corresponding field current excitation. Should the terminal voltage rise to a value OF, then the field excitation is reduced to a value OA. With a reduction of the field current to OA, the terminal voltage is reduced to a value OD. The reduction in the terminal voltage ED is just equal to the rise EF. While I have illustrated an appreciable fluctuation in the terminal voltage for the purpose of explaining the operation; in fact the fluctuation is very small, because, with the power grid-glow tubes and the photo-electric cell, correction is immediately made upon the slightest deviation of the terminal voltage from the normal value. Accordingly, my control system provides a very sensitive method of voltage correction. As is apparent, by impressing a substantially constant voltage upon the motor 460, the speed thereof may also be maintained substantially constant; provided, however, that the speed reduction resulting from the armature resistance drop of the motor 460 is just balanced by the increase in speed resulting from the armature reaction.

However, for the purpose of maintaining the speed of the motor 460 exactly constant, regardless of the armature resistance drop and the armature reaction, I provide for operating the electrical meter 394 from a magneto 463 that is driven by the motor 460, (see Fig. 15). As illustrated, the electrical meter 394 is connected to the windings of the magneto 463 by means of the conductor 466. In this manner, by means of the straight line characteristic of the magneto 463, in combination with the extreme sensitivity of the power grid-glow tubes and the photo-electric cell, this system of control provides a very fine speed regulation, irrespective of the load condition of the driving motor 460.

In Fig. 13 I illustrate a further modification of my control system wherein the motor 470 that is energized by the power grid-glow tubes is not connected directly to the load, but indirectly through a non-reversible gear reduction unit 471 and a differential represented, generally, by the reference character 469. Although either a mechanical or an electrical differential may be employed, I preferably utilize an electrical differential, such as an alternating current, constant speed motor having a rotor 473 connected directly to the load and a revoluble stator or primary 472. As diagrammatically illustrated, the revoluble primary 472 is connected to a suitable alternating current supply source through suitable brushes 474 that slidably engage slip rings indicated, generally, by the reference characters 475.

There is a considerable demand for an efficient, adjustable speed drive operating on alternating current and the present system adequately meets that demand. Many applications, such, for example, as large fans and blowers for power plants and coal pulverizers require a relatively large amount of power, but demand only a relatively small adjustable speed range in the neighborhood of the normal running speed. As will be seen, in the present modified form of my control system, the major part of the load is carried by the constant speed, alternating-current motor, while the minor portion of the load is carried by the motor 470 that is energized from the power grid-glow tube. Suppose, for illustration, that the operating conditions call for an adjustable speed range from 900 to 1200 revolutions per minute. Under this supposition, the alternating-current motor would be designed to run at a speed of 900 revolutions per minute, and the variation in speed between 900 and 1200 revolutions per minute would be provided for by varying the speed of the motor 470 by means of the power grid-glow tubes 361 and 366. That is to say, when the motor 470 is at a standstill, the load shaft rotates at 900 revolutions per minute and, when the motor 470 is operating at its maximum speed and driving the revoluble primary 472 in the same direction of rotation as the rotor 473, the load shaft rotates at 1200 revolutions per minute. The non-reversible gear reduction unit 471 may be provided with non-reversible worm gears, so that none of the thrust of the revoluble primary 472 is transmitted to the motor 470.

Inasmuch as the power grid-glow tubes 361 and 366 act as valves for controlling the amount of current delivered to the armature of the motor 470, the present modified system of control is very efficient, because there is no power loss in the power grid-glow tubes. Also, in the present modified control system there is no limit to the load, since the main alternating-current motor carries the major part of the load, while the motor 470 carries only such part of the load as to obtain the desirable adjustable speed range. The electrical meter 394 may be connected to any electrical circuit that is responsive to any condition which is to be controlled or regulated. For example, by electrically connecting the electrical meter 394 in circuit relation with a flow meter 365, by means of a control apparatus C, and mechanically connecting the load shaft to operate a suitable pump we have a means for maintaining the flow of the fluid or the gas through a flow pipe F at a predetermined selected value. Also, the electrical meter 334 may be connected to a magneto that is driven by the speed of the load shaft, and thereby maintain the speed of the load shaft at a predetermined selected value.

In general, the control system shown in Fig. 1 and the modified forms shown in Figs. 9 and 13 are such as to meet the requirements of any operating condition, especially those requiring close speed regulation.

It is to be pointed out that the fundamental circuits used through my invention are merely illustrative and, accordingly, they may take other forms. In the illustrated forms, the constancy or calibration of the circuits remain very accurate over a reasonable length of time, which is usually at least a year or more and this condition will improve with the manufacture of better tubes. However, should the operating conditions require that no change in the calibration take place over a period of several years, a suitable method may be employed, which counterbalances any change in the calibration.

Since certain changes in my invention may be made without departing from the spirit and scope thereof, it is intended that all matters contained in the foregoing description and shown in the accompanying drawings shall be interpreted as illustrative and not in a limiting sense.

I claim as my invention:

1. In combination with a source of electrical energy, a dynamo-electric machine, two power grid-glow tubes, means for connecting the power grid-glow tubes and the dynamo-electric machine in circuit relation with the source of electrical energy whereby the power grid-glow tubes may govern the operation of the dynamo-electric machine, a bridge phase-shifting circuit for controlling the power grid-glow tubes and thus the operation of the dynamo-electric machine, a light-sensitive device for controlling the bridge phase-shifting circuit, a source of light for influencing the light-sensitive device, a graph-member constructed substantially in accordance with an electrical characteristic of the dynamo-electric machine and movably positioned between the light sensitive device and the source of light for varying the amount of light falling upon the light-sensitive device and thus causing the power grid-glow tubes to govern the operation of the dynamo-electric machine, and means for actuating the movable graph-member in accordance with the condition of the dynamo-electric machine.

2. In combination with a source of electrical energy, a dynamo-electric machine adapted to perform a predetermined cycle of operation, two power grid-glow tubes, means for connecting the power grid-glow tubes and the dynamo-electric machine in circuit relation with the source of electrical energy whereby the power grid-glow tubes may govern the operation of the dynamo-electric machine, a bridge phase-shifting circuit for controlling the power grid-glow tubes and thus the operation of the dynamo-electric machine, a light-sensitive device for controlling the bridge phase-shifting circuit, a source of light for influencing the light-sensitive device, an endless graph-member having light transmitting portions constructed to produce said predetermined cycle and arranged to pass between the light-sensitive device and the source of light for varying the amount of light falling upon the light sensitive device and thus causing the power grid-glow tubes to govern the operation of the dynamo-electric machine, and means for actuating the endless graph-member to cause the dynamo-electric machine to perform the said predetermined cycle.

3. In combination with a source of electrical energy, an alternating current motor having a rotor and a revoluble primary, an electric motor connected to drive the revoluble primary, two power grid-glow tubes, means for connecting the power grid-glow tubes and the electric motor in circuit relation with the source of electrical energy whereby the power grid-glow tubes may govern the operation of the electric motor that drives the revoluble primary, a bridge phase-shifting circuit for controlling the power grid-glow tubes and thus the operation of the electric motor, a light-sensitive device for controlling the bridge phase-shifting circuit, a source of light for influencing the light-sensitive device, a graph-member movably positioned between the light-sensitive device and the source of light for varying the amount of light falling upon the light-sensitive device and thus causing the power grid-glow tubes to govern the operation of the electric motor, and means for actuating the graph-member.

4. In combination with a source of electrical energy, a variable voltage generator having an armature and a field winding, a motor having an armature connected in circuit relation with the armature of the said generator, two power grid-glow tubes, means for connecting the power grid-glow tubes and the field winding of the generator in circuit relation with the source of electrical energy whereby the power grid-glow tubes may govern the operation of the field winding of the generator, a bridge phase-shifting circuit for controlling the power grid-glow tubes and the operation of the field winding of the generator, a light-sensitive device for controlling the bridge phase-shifting circuit, a source of light for influencing the light-sensitive device, and means having a light-transmitting portion constructed substantially in accordance with a function of the magnetization characteristic of the generator for varying the amount of light falling upon the light-sensitive device to govern the operation of the field winding of the generator in accordance with the operating conditions of the electric motor.

5. In combination, a light-sensitive device, an electrical load, amplifying circuits interconnecting the light-sensitive device and the electrical load whereby the electrical load may be governed by the light-sensitive device, a light source for influencing the light-sensitive device, a movable graph-member having a light-transmitting portion for varying the amount of light falling upon the light-sensitive device to govern the electrical load, said light-transmitting portion being constructed substantially in accordance with the operating characteristics of the electrical load, and means responsive to the condition of the electrical load for actuating the movable graph-member.

6. In combination, a variable voltage generator having an armature and a field winding, a motor having an armature connected in circuit relation with the armature of the generator, a light-sensitive device, amplifying circuits controlled by the light-sensitive device for energizing the field winding of the generator, a light source for influencing the light-sensitive device, and means responsive to the electrical conditions of the armature of the motor for varying the amount of light falling upon the light-sensitive device, said means having a light-transmitting portion constructed substantially in accordance with a function of the magnetization characteristic of the generator.

7. In combination, an electrical load, having a predetermined cycle of operation, a light-sensitive device, amplifying circuits controlled by the light-sensitive device for energizing the electrical load, an endless graph-member having light-transmitting portions constructed to produce said predetermined cycle for varying the amount of light falling upon the light-sensitive device, and means for actuating the endless graph-member.

8. In combination, an electric device having a magnetization characteristic, a light-sensitive device, means for directing a plane of light upon the light-sensitive device, and a piece of material disposed laterally of, and arranged to move back and forth between definite limits with respect to, the plane of light for varying the amount of light falling upon the light-sensitive device, said piece of material having a light-transmitting portion constructed substantially in accordance with a function of the magnetization characteristic of the electric device which, when moved back and forth, varies the height of the plane of light falling upon the light-sensitive device in substantial accordance with a function of the magnetization characteristic of the device.

9. In combination with an alternating current supply source, a dynamo electric machine, a power grid-controlled tube having two conducting electrodes, means for connecting one of the conducting electrodes in circuit relation with the source of electrical energy to heat the said electrode, second means for connecting the two conducting electrodes of the power tube and the dynamo electric machine in circuit relation with the alternating current supply source whereby the power tube may govern the dynamo electric machine, said second means including circuit interrupting me. is to control the energization of the dynamo electric machine, a phase shifting circuit for controlling the power tube, a light-sensitive device for controlling the bridge phase shifting circuit and the power tube, a source of light for influencing the light-sensitive device, and means for varying the amount of light falling upon the light-sensitive device to govern the operation of the dynamo-electric machine.

10. In combination with a source of electrical energy, a dynamo electric machine, a power grid-controlled tube, means for connecting the power grid-controlled tube and the dynamo electric machine in circuit relation with the source of electrical energy whereby the power tube may govern the dynamo-electric machine, a bridge phase shifting circuit having a control winding for controlling the power tube, a light-sensitive device for governing the control winding and the power tube, a source of light for influencing the light-sensitive device, and means for varying the amount of light falling upon the light-sensitive device to govern the operation of the dynamo-electric machine.

11. In combination with an alternating current supply source, an electric motor having an armature, a power grid-controlled tube disposed to supply current to the armature of the motor, a starting relay for connecting the power tube in circuit relation with the alternating current supply source, and means responsive to a condition of the armature circuit for controlling the power tube, to cause the power tube to function earlier in the alternating current cycle as the counter-electromotive force of the armature increases.

12. In combination with a source of electrical energy, an electric motor having an armature, a power grid-controlled tube, disposed to supply current to the armature of the motor, means for connecting the power tube in circuit relation with the source of electrical energy, a light-sensitive device for controlling the power tube, a source of light for influencing the light-sensitive device, means for varying the amount of light falling upon the light-sensitive device, and means for controlling the light-varying means in response to a condition of the armature circuit of the electric motor.

13. In combination with a source of electrical energy, an electric motor having an armature, a power grid-controlled tube disposed to supply current to the armature of the motor, a relay for connecting the power tube in circuit relation with the source of electrical energy, a bridge phase shifting circuit for controlling the power tube, a light-sensitive device for controlling the bridge phase shifting circuit, a source of light for influencing the light-sensitive device, means for varying the amount of light falling upon the light-sensitive device, and means for governing the light-varying means in response to an electrical condition of the armature circuit of the motor.

14. In combination with a source of electrical energy, a dynamo electric machine adapted to perform a predetermined cycle of operation, a grid-controlled tube, means for connecting the power tube and the dynamo electric machine in circuit relation with the source of electrical energy whereby the power tube may govern the dynamo-electric machine, a light-sensitive device for controlling the power tube and the dynamo-electric machine, a source of light for influencing the light-sensitive device, an endless graph member having a light-transmitting portion constructed to produce said predetermined cycle and disposed to pass between the light-sensitive device and the source of light for varying the amount of light falling upon the light-sensitive device to govern the dynamo-electric machine, and means for actuating the endless graph member, thus causing the dynamo electric machine to perform the predetermined cycle.

15. In combination with a source of electrical energy, a generator having an armature and a field winding, a motor having an armature, two conductors for connecting the armature of the motor in circuit relation with the armature of the generator, a power grid-controlled tube, means for connecting the power tube and the field winding of the generator in circuit relation with the source of electrical energy whereby the power may govern the operation of the field winding of the generator, a light-sensitive device for controlling the power tube and the field winding of the generator, a source of light for influencing the light-sensitive device, means for varying the amount of light falling upon the light-sensitive device, said light varying means having a light-transmitting portion constructed substantially in accordance with a function of the generator, a potentially controlled device connected across the two conductors, and means for governing the light-varying means to control the operation of the field winding of the generator in accordance with the electrical conditions of the potentially controlled device.

16. In combination, an electrical device arranged to perform a predetermined cycle of operation, a light-sensitive device, circuit connections controlled by the light-sensitive device for governing the electrical device, a light source for influencing the light-sensitive device, and means constructed to produce said predetermined cycle for varying the amount of light falling upon the light-sensitive device to cause the electrical device to perform the said predetermined cycle.

17. In combination with a source of electrical energy, an electrical device arrange to perform a predetermined cycle of operation, amplifying means, circuit connections for connecting the amplifying means and the electrical device in circuit relation with the source of electrical energy, whereby the amplifying means may govern the electrical device, a light-sensitive device for controlling the amplifying means and the electrical device, a light source for influencing the light-sensitive device, and means constructed to produce said predetermined cycle for varying the amount of light falling upon the light-sensitive device to cause the electrical device to perform the said predetermined cycle.

18. In combination, an electrical device arranged to perform a predetermined cycle of operation, a light-sensitive device, circuit connections controlled by the light-sensitive device for governing the electrical device, a light source for influencing the light-sensitive device, an endless re-current means having a portion constructed to produce said predetermined cycle for varying the amount of light falling upon the light-sensitive device, guide means for passing the endless re-current means between the light-sensitive device and the light source, and means for actuating the endless re-current means to cause the electrical device to perform the said predetermined cycle.

19. In a system energized by a source of electrical energy for controlling the speed of a heavily loaded driven member in substantial accordance with an operating condition, in combination, a driven member, power driving means and a motor adapted to differentially drive the driven member, the differential combination of the driven member, the power driving means and the motor being such that the speed of the driven member may be varied by varying the speed of the motor, a power tube adapted to so control the speed of the motor as to take care of the speed variations of the driven member, said power tube having a power capacity less than that required to drive the driven member but sufficient to take care of speed variations of the driven member, means for connecting the power tube and the motor in circuit relation with the source of electrical energy, and means responsive to the operating condition for controlling the power tube and thus vary the speed of the motor and the driven member.

20. In combination, an electrical device, a light-sensitive device, amplifying circuits interconnecting the light-sensitive device and the electrical device, whereby the electrical device may be governed by the light-sensitive device, a light source for influencing the light-sensitive device, means for directing rays of light emanating from the light source upon the light-sensitive device, means for intercepting the rays of light and varying the amount of light falling upon the light-sensitive device to govern the electrical device, said intercepting means being constructed substantially in accordance with the operating characteristics of the electrical device, and means responsive to the condition of the electrical device for causing relative movement between the intercepting means and the rays of light.

21. In combination with an alternating current supply source, an electric motor having an armature, a power grid-controlled tube disposed to supply current to the armature of the motor, means for connecting the power tube in circuit relation with the alternating current supply source, and means for causing the power tube to function earlier in the alternating current cycle as the counter-electromotive force of the armature increases.

22. In combination with a source of electrical energy, a dynamo electric machine, a power grid-controlled tube, means for connecting the power grid-controlled tube and the dynamo electric machine in circuit relation with the source of electrical energy whereby the power tube may govern the dynamo electric machine, a bridge phase shifting circuit having a control winding for controlling the power tube, thermionic means for controlling the control winding, a light-sensitive device for governing the thermionic means, the control winding, and the power tube, a source of light for influencing the light-sensitive device, and means for varying the amount of light falling upon the light-sensitive device to govern the operation of the dynamo electric machine.

23. In combination with an alternating current supply source, an electric motor having an armature, a power grid-controlled tube disposed to supply current to the armature of the motor, means for connecting the power tube in circuit relation with an alternating current supply source, and means responsive to the counter-electromotive force of the armature circuit for varying the portion of the alternating current cycle through which the power tube passes current.

24. In combination, an electric motor having an armature, means responsive to the counter-electromotive force of the armature and operative for all load conditions for maintaining the armature current at substantially a constant value throughout the starting period until the motor attains a predetermined speed, said means being further arranged after the motor attains said predetermined speed for causing the motor to maintain substantially said predetermined speed and for allowing the armature current to decrease to the running current value.

25. In a system energized by a source of electrical energy for controlling the speed of a heavily driven load in substantial accordance with a varying condition, in combination, a load, an alternating current motor having a rotor and a revoluble primary, said motor being disposed to carry the major part of the load, a second electric motor of limited capacity connected to drive the revoluble primary, said second motor being disposed to carry the minor part of the load, a power tube having two conducting electrodes adapted to so control the speed of the second motor as to take care of the speed variations of the load, said power tube having a power capacity less than that required to drive the load but sufficient to take care of the speed variations of the load, means for connecting the power tube and the second motor in circuit relation with the source of electrical energy, interrupting means for disconnecting the power tube from circuit relation with the said source of electrical energy, and means responsive to the said varying condition for controlling the output of the power tube and thus vary the speed of the second motor and the load.

26. In a system energized by a source of electrical energy for controlling the speed of a driven member in substantial accordance with a varying condition, in combination, a differential mechanism having a plurality of rotating parts, a driven member driven by one of the said rotating parts of the differential mechanism, an electric motor connected to drive another of said rotating parts of the differential mechanism, the combination of the differential mechanism, the driven member and the electric motor being such that the speed of the driven member may be varied by varying the speed of the motor, a power tube adapted to so control the speed of the electric motor as to take care of the speed variations of the driven member, means for connecting the power tube and the electric motor in circuit relation with the source of electrical energy, said power tube having a power capacity less than that required to drive the driven member but sufficient to take care of speed variations of the driven member, and means responsive to the said varying condition for controlling the power tube and thus vary the speed of the electric motor and the driven motor.

27. In a system energized by a source of electrical energy for controlling the speed of a driven member in substantial accordance with a varying condition, in combination, a driven member, a power driving means and a motor adapted to differentially drive the driven member, the differential combination of the driven member, the power driving means and the motor being such that the speed of the driven member may be varied by varying the speed of the motor, a power tube adapted to so control the speed of the motor as to take care of the speed variations of the driven member, said power tube having a power capacity less than that required to drive the driven member but sufficient to take care of speed variations of the driven member, means for connecting the power tube and the motor in circuit relation with the source of electrical energy, a phase shifting means for controlling the power tube and means responsive to the said varying condition for controlling the phase shifting means and the power tube and thus vary the speed of the motor and the driven member.

28. In combination with an alternating current supply source, an electric motor having an armature, a power tube connected in circuit arrangement with, and arranged to supply current to, the armature, means responsive to the counter-electromotive force of the armature for causing the power tube to function earlier in the alternating current cycle as the counter-electromotive force of the armature increases to a pre-determined value, said means being further arranged to cause the power tube to function later in the alternating current cycle as the counter-electromotive force of the armature increases beyond said pre-determined value.

29. In combination with a source of electrical energy, an electrical device, a power grid-controlled tube for governing the flow of the current through the electrical device from the source of electrical energy, a phase shifting circuit having a control winding for controlling the power tube, thermionic means having grid and plate circuits for controlling the control winding, and means for affecting the grid circuit of the thermionic means to vary the impedance of the control winding and the operation of the electrical device.

30. In combination with a source of electrical energy, an electrical device, a power grid-controlled tube, a relay for connecting the power grid-controlled tube and the electrical device in circuit relation with the source of electrical energy, whereby the power tube may govern the operation of the electrical device, a phase shifting circuit having a control winding for controlling the power tube, thermionic means having grid and plate circuits for controlling the control winding, and means for affecting the grid circuit of the thermionic means to vary the impedance of the control winding and the operation of the electrical device.

31. In combination with an alternating current supply source, an electrical device, a power grid-controlled tube disposed to control the flow of the current to the electrical device from the alternating current supply source and change the potential condition of the said electrical device, and means responsive to the changed potential condition of the electrical device for controlling the power tube and vary the portion of the alternating current cycle through which the power tube passes current.

32. In combination with an alternating current supply source, an electrical device, a power grid-controlled tube disposed to control the flow of the current to the electrical device from the alter thereof the plate circuit of the thermionic tube, having grid and plate circuits, an alternating current phase shifting circuit having as one part thereof the plate circuit of the thermionic tube, and means for affecting the grid circuit of the thermionic tube and thereby vary the operation of the power grid-controlled tube.

33. In combination with an alternating current supply source, an electrical device, a power grid-controlled tube for controlling the flow of the current to the electrical device from the alternating current supply source and change the potential condition of the electrical device, a thermionic tube having grid and plate circuits, an alternating current phase shifting circuit for the power grid-controlled tube, said phase shifting circuit having as one part thereof, the plate circuit of the thermionic tube, and means responsive to the changed potential condition of the electrical device for affecting the grid circuit of the thermionic tube and thereby affect the operation of the power grid-controlled tube.

34. In combination, an electrical device, a generator which supplies current to the electrical device and changes the potential condition thereof, a generator field circuit, an arc-discharge tube for exciting the generator field, said tube having a control element, a thermionic tube having grid and plate circuits, an alternating current phase shifting circuit for the control element of the arc-discharge tube, said phase shifting circuit having as one part thereof the plate circuit of the thermionic tube, and means responsive to changes in the potential of the electrical device to affect the grid circuit of the thermionic tube and thereby to vary the operation of the arc-discharge tube.

35. In combination, a transformer having a primary winding and a plurality of secondary windings, an electrical device, a power grid-controlled tube having a grid and two conducting electrodes, means for connecting the two conducting electrodes of the power tube and the electrical device in circuit relation with one of the said plurality of secondary windings, whereby the power tube may govern the electrical device, a phase shifting circuit energized by another of the said plurality of secondary windings for controlling the grid of the power tube, a light sensitive device for controlling the phase shifting circuit and the power tube, a source of light for influencing the light-sensitive device, and means for varying the amount of light falling upon the light-sensitive device to govern the operation of the electric device.

36. In combination, a transformer having a primary winding and a plurality of secondary windings, an electrical device, a power grid-controlled tube having a grid and two conducting electrodes, means for connecting the two conducting electrodes of the power tube and the electrical device in circuit relation with one of the said plurality of secondary windings, whereby the power tube may govern the electrical device, a thermionic tube having grid and plate circuits, a phase shifting circuit energized by another of the said plurality of secondary windings for controlling the grid of the power tube, said phase shifting circuit having as one part thereof the plate circuit of the thermionic tube, and means for affecting a grid circuit of the thermionic tube and thereby varying the operation of the power grid-controlled tube.

37. In combination with the source of alternating current, an electric motor energized by the source of alternating current, means for governing the flow of the alternating current to the electric motor by varying the portion of the alternating current cycle through which current is passed, and means for causing the current governing means to pass momentarily a relatively large amount of current to the motor during the initial stages of the starting period of the motor, said means being further arranged for thereafter causing the current governing means to pass current to the motor at a rate to give a gradual acceleration to the motor until it attains a predetermined speed.

38. An electric system arranged to be energized by a source of alternating current comprising, in combination, a load circuit, circuit means connecting the load circuit to the source of alternating current, arc-discharge means connected to control the flow of current in said load circuit, control means for rendering said arc-discharge means conducting to permit the flow of load current, phase shift means connected to be energized from the source of alternating current for effecting the functioning of said control means at a predetermined time in a cycle of the alternating current, means for controlling the functioning of said phase shift means to vary the time in each cycle when said arc-discharge means is rendered conducting, and means for rendering said control means effective at intervals in controlling the conductivity of said arc-discharge means.

39. An electric system arranged to be energized by a source of alternating current comprising, in combination, a load circuit, circuit means connecting the load circuit to the source of alternating current, arc-discharge means connected to control the flow of current in said load circuit, control means for rendering said arc-discharge means conducting to permit the flow of load current, phase shift means connected to be energized from the source of alternating current for effecting the functioning of said control means at a predetermined time in a cycle of the alternating current, a light-sensitive device for controlling the phase shift means and the control means to govern the conductivity of said arc-discharge means, a source of light for influencing the light-sensitive device, movable means disposed between the light source and the light-sensitive device for intercepting the light rays emanating from the light source at intervals to control the functioning of the light-sensitive device and the arc-discharge means.

40. An electric system arranged to be energized by a source of alternating current comprising, in combination, a load circuit, circuit means connecting the load circuit to the source of alternating current, arc-discharge means connected to control the flow of current in said load circuit, control means disposed to render said arc-discharge means conducting to permit the flow of load current, phase shift means including an impedance device connected to be energized from the source of alternating current for effecting the functioning of said control means at a predetermined time in each cycle of the alternating current, means for regulating said impedance device to vary the time in each cycle at which said arc-discharge means is rendered conducting for supplying current to the load circuit, and means for rendering said control means effective at intervals to control the conductivity of said arc-discharge means.

41. An electric system arranged to be energized by a source of alternating current comprising, in combination, a load circuit, circuit means connecting the load circuit to a source of alternating current, arc-discharge means connected to conduct the entire flow of current in said load circuit, control means for rendering said arc-discharge means conducting to permit the flow of load current, phase shift means including an impedance means connected to be energized from the source of alternating current for effecting the functioning of said control means at a predetermined time in each cycle of the alternating current, vacuum tube means provided with control electrode means for controlling said impedance means, means for controlling the energization of said control electrode means to vary the time in each cycle at which said arc-discharge means is rendered conducting, and means for rendering said control means effective at intervals to control the conductivity of said arc-discharge means.

42. In combination with a source of alternating current, a load circuit, an arc-discharge means having two conducting electrodes, connecting means for connecting the two conducting electrodes of the arc-discharge means and the load circuit in circuit relation with the alternating current supply source whereby the arc-discharge means may govern the flow of the current to the load circuit, said connecting means including circuit interrupting means to control the energization of the load circuit and the arc-discharge means, a phase shifting circuit for controlling the conductivity of the arc-discharge means, a light-sensitive device for controlling the phase shifting circuit and the arc-discharge means, a source of light for influencing the light sensitive device, and means for governing the light on the light-sensitive device to govern the arc-discharge means and the flow of the current to the load circuit.

43. In combination with a source of alternating current, a load circuit, an arc-discharge means, means for connecting the arc-discharge means and the load circuit in circuit relation with the source of alternating current whereby the arc-discharge means may govern the flow of the current to the load circuit, a phase shifting circuit having an impedance means for controlling the arc-discharge means, thermionic means for controlling the impedance means, a light-sensitive device for governing the thermionic means, the impedance means and the arc-discharge means, a source of light for influencing the light sensitive device, and means for governing the light on the light-sensitive device to govern the arc-discharge means and the flow of the current to the load circuit.

44. In a system arranged to be energized by a source of alternating current for controlling the speed of a driven member in substantial accordance with variable means, in combination, a driven member, a power driving means and a motor adapted to differentially drive the driven member, the differential combination of the driven member, the power driving means and the motor being such that the speed of the driven member may be varied by varying the speed of the motor, circuit means connecting the motor to the source of alternating current, arc-discharge means connected to control the flow of the current to said motor and the speed thereof so as to take care of the speed variations of the driven member, said arc-discharge means having a power capacity less than that required to drive the driven member but sufficient to take care of speed variations of the driven member, control means for rendering said arc-discharge means conducting to permit the flow of current to said motor, phase shift means connected to be energized from the source of alternating current for effecting the functioning of the said control means at a predetermined time in a cycle of the alternating current, means responsive to the variable means for controlling the functioning of said phase shifting means to vary the time in each cycle when said arc-discharge means is rendered conducting to thus vary the speed of the motor and the driven member.

GEORGE V. WOODLING.

Certificate of Correction

Patent No. 2,139,295.    December 6, 1938.

GEORGE V. WOODLING

It is hereby certified that error appears in the printed specification of the above numbered patent requiring correction as follows: Page 11, second column, line 32, claim 32, strike out the words and comma "thereof the plate circuit of the thermionic tube," and insert instead *nating current supply source, a thermionic tube*; and that the said Letters Patent should be read with this correction therein that the same may conform to the record of the case in the Patent Office.

Signed and sealed this 18th day of March, A. D. 1947.

[SEAL]

LESLIE FRAZER,
*First Assistant Commissioner of Patents.*